(12) United States Patent
Belanger et al.

(10) Patent No.: US 10,632,976 B2
(45) Date of Patent: *Apr. 28, 2020

(54) PAD ELEMENT FOR A ROTARY BRUSH VEHICLE WASH COMPONENT

(71) Applicant: WashMe Properties, LLC, Northville, MI (US)

(72) Inventors: Michael J. Belanger, Northville, MI (US); Barry S. Turner, Novi, MI (US); David L. Tognetti, Howell, MI (US); Mark D. Morin, Plymouth, MI (US)

(73) Assignee: WashMe Properties, LLC, Northville, MI (US)

( * ) Notice: Subject to any disclaimer, the term of this patent is extended or adjusted under 35 U.S.C. 154(b) by 563 days.

This patent is subject to a terminal disclaimer.

(21) Appl. No.: 14/327,744

(22) Filed: Jul. 10, 2014

(65) Prior Publication Data

US 2015/0274136 A1    Oct. 1, 2015

Related U.S. Application Data

(60) Provisional application No. 61/972,764, filed on Mar. 31, 2014, provisional application No. 61/972,854, filed on Mar. 31, 2014.

(51) Int. Cl.
*B60S 3/04* (2006.01)
*B60S 3/06* (2006.01)
(Continued)

(52) U.S. Cl.
CPC .............. *B60S 3/042* (2013.01); *A46B 11/06* (2013.01); *A46B 13/008* (2013.01); *A46B 13/02* (2013.01);
(Continued)

(58) Field of Classification Search
CPC ......... A46B 11/06; A46B 13/02; A46B 13/04; A46B 13/008; A46B 2200/3046; B60S 3/06

See application file for complete search history.

(56) References Cited

U.S. PATENT DOCUMENTS 4,192,037 A * 3/1980 Capra ..................... B60S 3/042
15/53.4
4,198,722 A    4/1980 Ennis
(Continued)

FOREIGN PATENT DOCUMENTS

DE    3740627 A1    6/1989

OTHER PUBLICATIONS

International Search Report, dated Oct. 6, 2015, 3 pages.

*Primary Examiner* — Katelyn B Whatley
(74) *Attorney, Agent, or Firm* — John S. Artz; Dickinson Wright PLLC (57) ABSTRACT

A component for a vehicle wash system includes a rotatable stem portion and a backing member in communication with the rotatable stem portion. The backing member is configured to rotate with the stem portion about an axis of rotation defined by the centerline of the stem portion. A plurality of media elements are secured to the backing member with the plurality of media elements being constructed of a generally self-supporting, non-marring material and wherein the plurality of media elements are oriented generally perpendicular to the backing member. The plurality of media elements configured to rotate in a working plane defined by the backing member and the working plane is oriented generally perpendicularly to the axis of rotation. Additionally, the plurality of media elements are configured during a wash process to contact at least an exterior painted surface of a vehicle to effectuate cleaning thereof.

28 Claims, 11 Drawing Sheets

(51) Int. Cl.
*A46B 13/00* (2006.01)
*A46B 11/06* (2006.01)
*A46B 13/02* (2006.01)
*A46B 13/04* (2006.01)

(52) U.S. Cl.
CPC ............... *A46B 13/04* (2013.01); *B60S 3/06* (2013.01); *A46B 2200/3046* (2013.01)

(56) References Cited

U.S. PATENT DOCUMENTS

| | | | |
|---|---|---|---|
| 4,597,128 A | | 7/1986 | Roncaglione |
| 4,878,262 A | | 11/1989 | Stufllebeam et al. |
| 6,408,480 B1 | * | 6/2002 | Wiemann ............. B24D 13/145 |
| | | | 15/230.12 |
| 8,347,443 B1 | | 1/2013 | Conrad |
| 2007/0174981 A1 | * | 8/2007 | Smith ....................... B60S 3/06 |
| | | | 15/53.2 |
| 2009/0241989 A1 | | 10/2009 | MacNeil |
| 2010/0186183 A1 | * | 7/2010 | Weinberger ........ A46B 15/0055 |
| | | | 15/236.02 |

* cited by examiner

PAD ELEMENT FOR A ROTARY BRUSH VEHICLE WASH COMPONENT

CROSS REFERENCE TO RELATED APPLICATIONS

The present application claims priority to U.S. Provisional Patent Application Ser. No. 61/972,764, entitled "Rotary Brush Apparatus for a Vehicle Wash System", which was filed on Mar. 31, 2014 and U.S. Provisional Patent Application Ser. No. 61/972,854, entitled "Rotary Brush Apparatus", which was filed on Mar. 31, 2014, the disclosures of which are hereby incorporated by reference.

TECHNICAL FIELD

The present disclosure relates generally to a rotary brush apparatus for a vehicle wash. More specifically, the present disclosure relates to a pad element for a rotary brush apparatus that provides improved cleaning capabilities for a vehicle exterior.

BACKGROUND FOR THE INVENTION

Rotary brush apparatuses are frequently used in vehicle washes or vehicle wash systems for contacting, scrubbing, and cleaning exteriors of vehicles. These brushes typically include a rotary hub portion with an axis of rotation that is oriented parallel to a vehicle exterior and includes a plurality of media elements that are coupled to the hub portion, which are intended to engage the vehicle. As the rotary hub is driven about its axis of rotation, the plurality of media elements blossom generally outward (perpendicular with respect to the axis of rotation) due, in part, to centrifugal force, so that they can contact a vehicle exterior to remove dirt and debris and effectuate cleaning. To apply increased scrubbing and cleaning, the rotary hub can be rotated faster to increase the speed at which the media elements contact the vehicle exterior. This generally creates an increased slapping noise due to an increased force of contact between the media elements and the vehicle exterior, which can make the car wash experience unenjoyable for a user. Also, as the speed of the brush increases, the perception of potential damage to the vehicle exterior increases.

These rotary brush apparatus are configured such that the media elements are oriented generally perpendicular to the brush axis of rotation during use. As such, as the rotary hub is driven, the media elements only contact the vehicle exterior in a single direction, which limits the cleaning capabilities of the media elements and thus the effectiveness of the wash process. For example, with respect to a conventional side brush apparatus, as the hub rotates, the media elements are configured to contact a side exterior surface of the vehicle in only one direction, i.e., a front to back direction. In other words, the media elements contact a forward part of the exterior surface and move backward along the vehicle exterior before losing contact therewith. As such, any force applied to the vehicle exterior to remove dirt and debris is applied on only a single direction.

While rotary brushes having an axis of rotation which is oriented generally perpendicular to a vehicle exterior are also known, these brushes are only used to clean vehicle wheels as they employ hard or rigid media elements, such as synthetic bristles. As the bristles will mar a painted surface, they are not suitable for cleaning or treating a vehicle exterior. Moreover, these rotary brush assemblies also include a rigid hub or backing portion. Thus, if the media elements secured to these rigid structures encounter angled or curved exterior vehicle surfaces, the brush assemblies cannot accommodate these variations and thus are not suitable for use for cleaning a vehicle exterior for this additional reason.

It would therefore be desirable to provide a rotary brush apparatus that yields improvements over these deficiencies.

SUMMARY OF THE INVENTION

It is therefore an aspect of the present disclosure to provide a rotary brush apparatus for a vehicle wash system that can provide improved cleaning of a vehicle exterior surface.

It is another aspect of the present disclosure to provide a rotary brush apparatus for a vehicle wash system that more effectively cleans contoured surfaces, corners and/or complex surfaces of a vehicle exterior.

It is still another aspect of the present disclosure to provide a rotary brush apparatus for a vehicle wash system that provides improved cleaning of a vehicle exterior without marring or scratching of the vehicle exterior.

It is still a further aspect of the present disclosure to provide a rotary brush apparatus for a vehicle wash system that provides improved cleaning of a vehicle exterior by way of multi-directional contact between the brush media elements and the vehicle exterior.

In accordance with the above and the other aspects, a component for a vehicle wash system is provided. The component includes a rotatable stem portion and a backing member in communication with the rotatable stem portion. The backing member is configured to rotate with the stem portion about an axis of rotation defined by the centerline of the stem portion. A plurality of media elements are secured to the backing member with the plurality of media elements being constructed of a generally self-supporting and flexible material and wherein the plurality of media elements are oriented generally perpendicular to the backing member. The plurality of media elements are configured to rotate in a working plane defined by the backing member and the working plane is oriented generally perpendicularly to the axis of rotation. Additionally, the plurality of media elements are configured during a wash process to contact at least an exterior painted surface of a vehicle to effectuate cleaning thereof.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

According to an aspect, the present disclosure relates to a treatment component for a vehicle wash system. The vehicle wash system may be configured as a tunnel car wash, where a vehicle is conveyed through the wash process by a conveyor or the like as is known in the art. Alternatively, the vehicle wash system may be configured as a roll-over type where the vehicle remains stationary and the various treatment components are translated and moved with respect to the vehicle to perform the vehicle wash process. Other suitable wash processes and systems may also be employed as are known. According to an aspect, the vehicle wash system may be housed within a vehicle wash facility having an entrance end where a vehicle enters and an exit end where the vehicle leaves. It will be appreciated that the disclosed treatment component could also be employed in connection with a variety of other applications outside of a vehicle wash system, such as a manual or self-serve wash process or in applications unrelated to the wash industry.

According to a further aspect, the vehicle wash system may include a plurality of vehicle wash components that engage and/or treat the exterior of a vehicle as it passes through the vehicle wash facility to effectuate a vehicle wash process. For example, the components can include a rinse arch, which sprays water onto a vehicle. Another component can include a bubble device that generates bubbles and emits them directly onto a vehicle exterior. An exemplary bubble device that may be employed with the disclosed system is contained in Applicant's co-pending U.S. patent application Ser. No. 13/864,813, entitled "A Vehicle Wash Component for Emitting Bubbles", filed Apr. 17, 2013, the disclosure of which is hereby incorporated by reference. Other suitable devices for generating bubbles or foam may also be employed. Other components may include one or more top brushes for contacting a top exterior surface of a vehicle, a plurality of side brushes for contacting side exterior vehicle surfaces, and a plurality of wrap brushes for contacting front and back surfaces of a vehicle. Another component may include wheel scrubbers for engaging vehicle wheels. A further component that may be employed can include a drying section for removing water from the vehicle exterior. According to a further aspect, the system can include a wheel polishing device for treating vehicle wheels.

It will be appreciated that more, less or different wash components may be employed. Additionally, multiples of the same components may be employed as part of a wash system as desired. Further, the components may take on a variety of different configurations. Moreover, the order, placement and sequence of the components within the system may also vary. According to an aspect, the components may be designed to engage and/or treat a vehicle disposed within a vehicle treatment area of the vehicle wash facility.

According to an aspect, the present disclosure relates to an improved vehicle wash component for treating an exterior painted surface of a vehicle. With reference generally to FIGS. 1 through 7, the vehicle wash component may be configured as a rotary brush assembly 10 that may be disposed adjacent a vehicle treatment area of a vehicle wash system. According to an aspect, the brush assembly 10 may generally include a stem portion 12, a backing member 14, and a plurality of media elements 16. It will be appreciated that the rotary brush assembly 10 could include more or less components as desired. It will be appreciated that the rotary brush assembly 10 may be utilized to clean a vehicle exterior surface. However, it will be appreciated that the rotary brush assembly 10 could be employed to clean a variety of other suitable surfaces and could be employed in connection with a variety of other applications.

Figure 1:
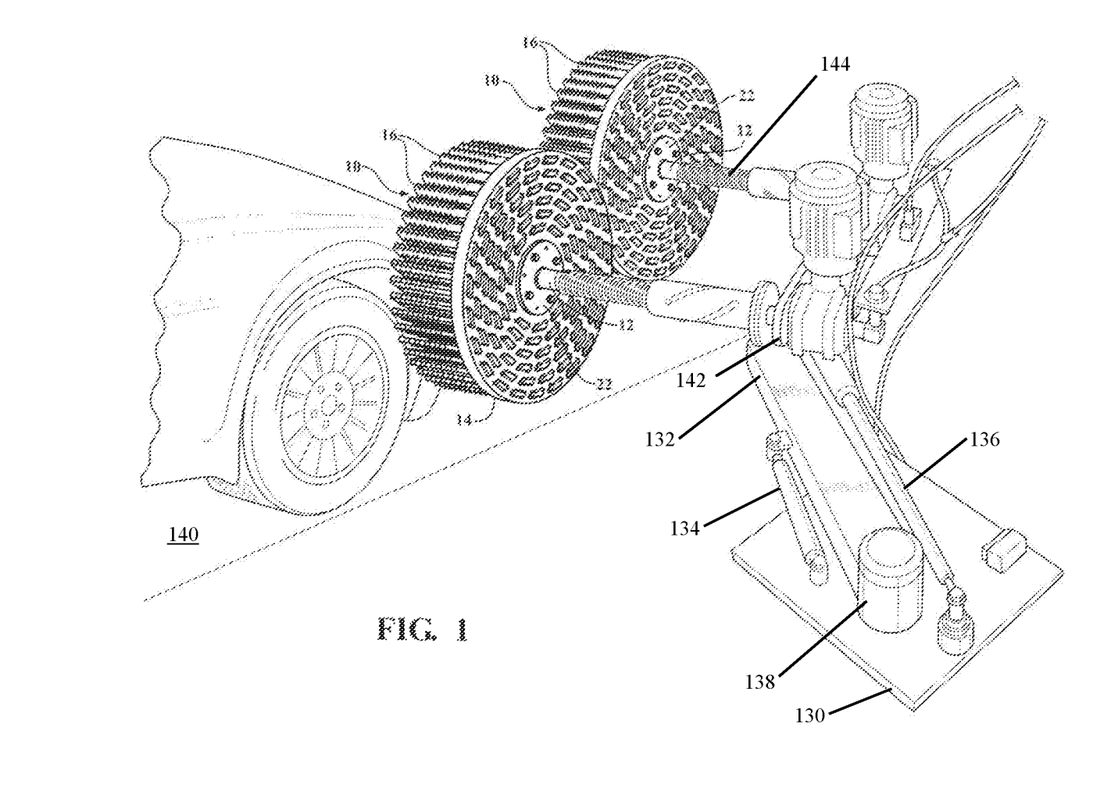
FIG. 1 is a schematic illustration of a rotary brush assembly for a vehicle wash system adjacent a vehicle exterior in accordance with an aspect of the present disclosure.
Figure 2:
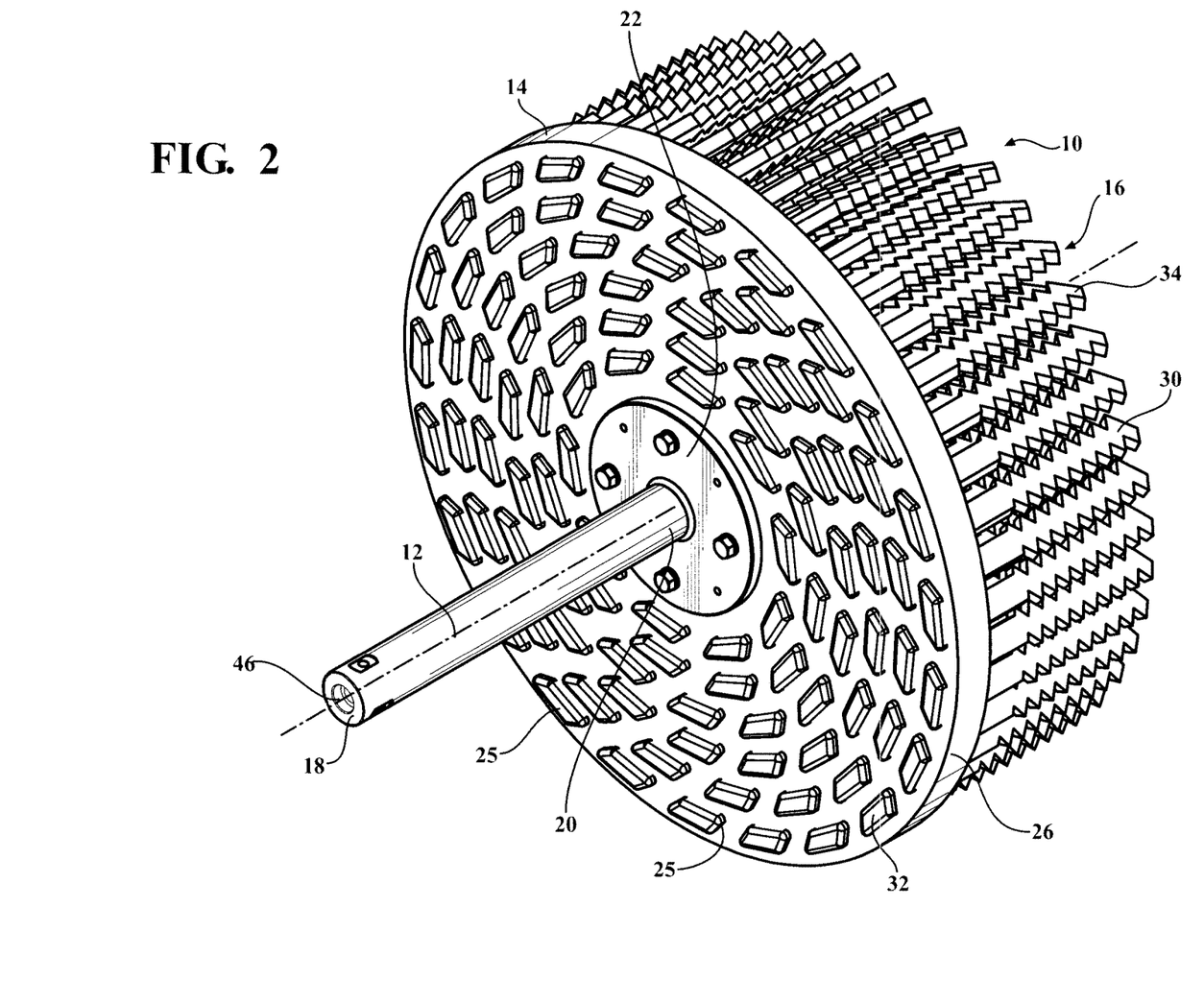
FIG. 2 is a rear perspective view of a rotary brush assembly for a vehicle wash system according to an aspect of the present disclosure.
Figure 3:
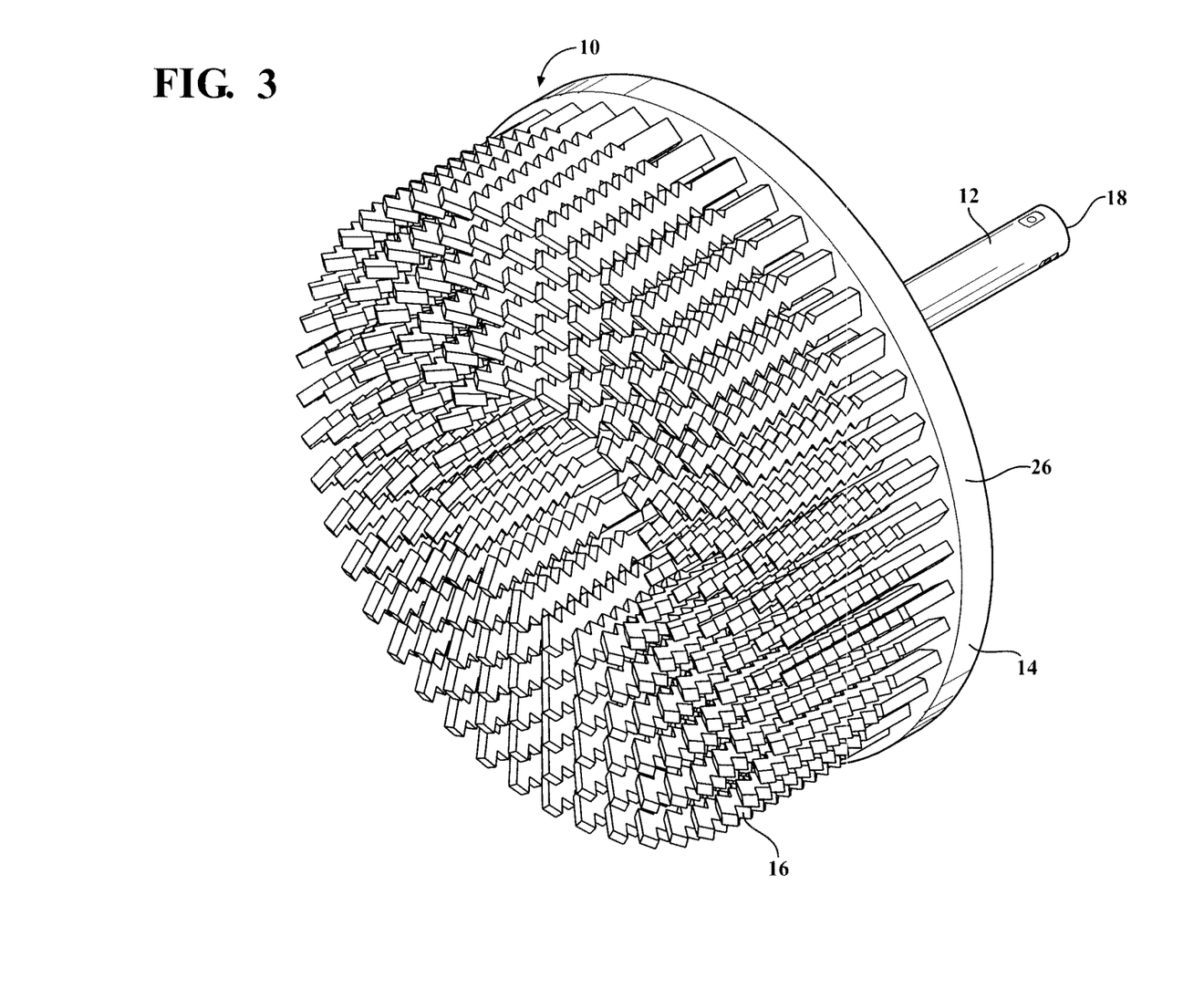
FIG. 3 is a front perspective view of the rotary brush assembly of FIG. 1.
Figure 4:
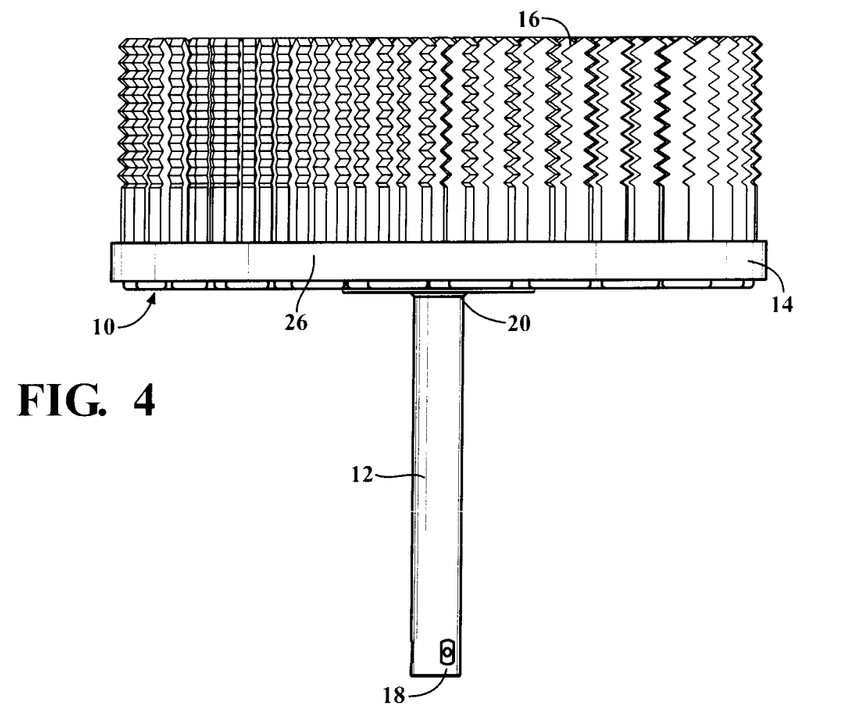
FIG. 4 is a top view of the rotary brush assembly of FIG. 1.
Figure 5:
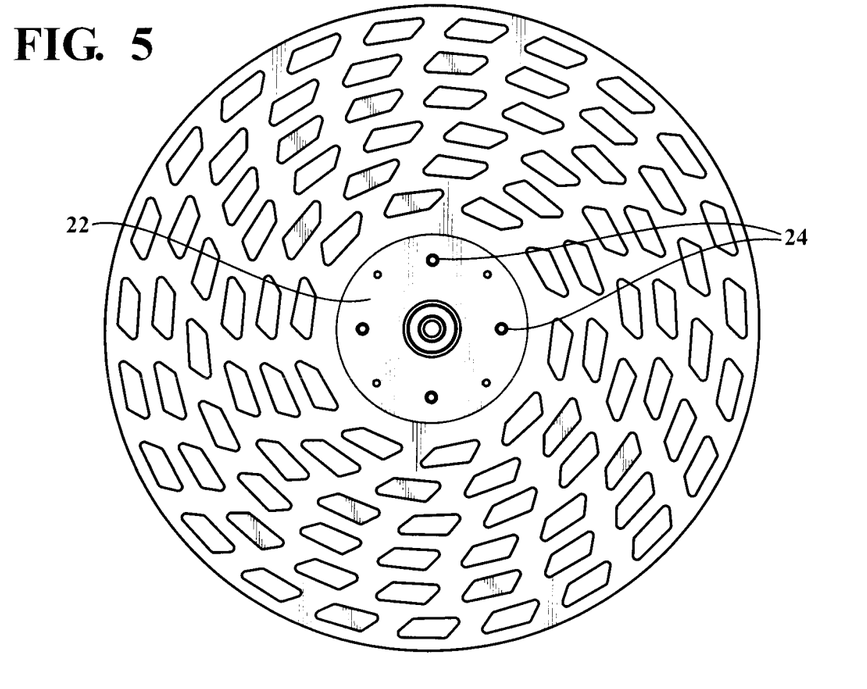
FIG. 5 is a rear view of the rotary brush assembly of FIG. 1.

According to an aspect, the stem portion 12 can generally define an axis of rotation about its centerline $C_L$. The stem portion 12 can include a first end 18 and a second end 20. The first end 18 of the stem portion 12 may be in communication with a drive mechanism (not shown) such as a motor or the like as will be understood by one of ordinary skill in the art. The drive mechanism may be employed to effectuate rotation of the stem portion 12 about the axis of rotation. The second end 20 of the stem portion 12 may be in communication with weldment assembly 22 to effectuate securement thereof to the backing member 14 such that the backing member 14 can rotate with the stem portion 12. It will be appreciated that the stem portion 12 may be secured to the backing member 14 by a variety of other suitable mechanism(s). According to an aspect, the weldment assembly 22 may be secured to the backing member 14 by a plurality of fasteners 24 or the like. According to another aspect, the stem portion 12 may be generally hollow from the first end 18 to the second end 20 and include one or more fluid lines therein such that fluid can be conveyed from a fluid source (not shown) to the backing member 14, as discussed in more detail below. The weldment assembly 22 may be secured to the backing member 14 in a variety of other suitable ways. The stem portion 12 is in communication with a spring 144 that surrounds the stem portion 12 and biases the backing member 14 into the vehicle treatment area 140 while also allowing the backing member 14 to move away from the vehicle treatment area 140 in response to a shape of the vehicle exterior surface in the vehicle treatment area 140. The stem portion 12 is mounted on a support arm 132 which is in turn mounted to a baseplate 130 by a pivotable connection 138. The angle of the stem portion 12 axis of rotation relative to a vehicle treatment area 140 and relative to a vehicle in the vehicle treatment area 140 can be adjusted by action of a first control cylinder 134 and a second control cylinder 136. The angle between the axis of rotation and the vehicle treatment area or the vehicle exterior surface can vary by action of the first cylinder 134 and second cylinder 136 between 90 degrees and approximately 30 degrees. As can be seen in FIG. 1, one of the two ends of each of the control cylinders 134, 136 is fixed to the baseplate 130 and the other end of each control cylinder 134, 136 is fixed to the support arm 132. Also as shown in FIG. 1, as the second control cylinder 136 is fully extended, the first control cylinder 124 is fully retracted, thus as can be seen the control cylinders 134 and 136 move simultaneously in opposite directions, the two directions being extension or retraction of the cylinders as known to one of skill in the art, to thereby effect rotation of the support arm 132 about the pivotable connection 138 and to thus control the angle between the axis of rotation and the vehicle treatment area or the vehicle exterior surface. Each of the stem portions 12 being mounted to a brush support portion 142 under control of a controller, not shown, wherein the brush support portion 142 can be pivoted about a vertical axis by the controller so that each of the brush assemblies 10 can be located at a different distance from the vehicle exterior for a vehicle in the vehicle treatment area 140. This allows the contour of the vehicle exterior to be followed by the brush assemblies 10.

According to an aspect, the backing member 14 may be formed of a soft flexible or pliable material such that it can move or flex to accommodate different vehicle contours or features during operation, such as corners, curves, tight areas and/or other complex surfaces. According to an aspect, the flexibility of the backing member 14 can provide significantly improved cleaning of a vehicle exterior during a vehicle wash process by providing more consistent contact between the media elements 16 and the vehicle exterior. According to another aspect, the backing member 14 can be formed of a material that has memory. In other words, the backing member 14 can be formed of a material that can move from a starting position, but has memory to return to its original position after it has been displaced. According to an aspect, as some media elements 16 flex to accommodate vehicle surface contours, a portion of the backing member 14 may flex outwardly (away from the vehicle treatment area) with respect to a reference plane defined by the backing member 14, while the reminder of the backing member 14 still resides in the plane. The displaced portion will then return to the plane. According to one aspect, the backing member 14 may be formed of ethylene vinyl acetate ("EVA") material. It will be appreciated that the backing member 14 can be formed of a variety of other suitable materials, including polyethylene foam. According to a still further aspect, the backing member 14 may be formed from a variety of suitable processes, including vacuum forming.

As shown, the backing member 14 may be configured in the shape of a generally circular disk and may have a generally planar configuration. However, the backing member 14 may have a variety of different shapes and may have other orientations, such as curved or non-planar. According to one aspect, the backing member 14 may have a generally convex shape such that the outer periphery 26 of the backing member 14 is further away from the vehicle treatment area than a middle portion 28 of the backing member 14. According to another aspect, the backing member 14 could have a concave shape. According to another example, the backing member 14 may be configured with spaced apart spokes like a wagon wheel with a discontinuous outer periphery. Additionally, the backing member 14 may have a variety of different sizes and thicknesses. According to a further aspect, the backing member 14 may be adaptable for a variety of different purposes or applications, including for floor cleaning, deck cleaning, boat cleaning or a variety of other suitable applications.

According to another aspect, the plurality of media elements 16 may be secured to the backing member 14 such that they rotate therewith. As shown, according to one aspect, the backing member 14 may have a plurality of openings 25 formed therein such that each of the media elements 16 may be threaded or woven through a respective one of the plurality of openings 25 to secure it to the backing member 14. According to one aspect, each media element 16 could have a first end 30, a middle portion 32, and a second end 34. Each media element 16 could be secured to the backing member 14 such that the first end 30 and the second end 34 each extend outward from the backing member 14 with the middle portion 32 being woven through a pair of openings 25. It will be appreciated that the plurality of media elements 16 could be secured to the backing member 14 in a variety of different ways. It will also be appreciated that the openings 25 may have a variety of different shapes, including circular. According to an aspect, the woven nature of the attachment of the media elements 16 to the backing member 14 can allow these components to be securely attached without any additional securing mechanism.

According to a further aspect, the media elements 16 may be configured such that they are substantially self-supporting and remain oriented substantially perpendicular to the backing member 16 during operation. In other words, according to an aspect, the media elements 16 may be constructed so as to retain their shape during rest and operation such that they do not sag or droop. According to this aspect, because the media elements 16 are self-supporting, they can exert a consistent pressure on the vehicle surface and make contact at more or less predetermined locations, regardless of the brush's rotational speed. This can provide more effective cleaning of the vehicle exterior. According to an aspect, the media elements 16 may be formed of a non-marring material that will not damage a painted exterior surface, such as a foam material, including an EVA. However, it will be appreciated that a variety of other suitable materials may be employed to form the media elements that will not scratch, mar or otherwise damage a painted surface of a vehicle. For example, instead of foam, a synthetic material may be employed such as is employed with plastic bristles. One of ordinary skill will understand the media elements configured as bristles may alternatively be employed.

According to an aspect, the weldment assembly 22 may be secured by the plurality of fasteners 24 to a retaining plate 40 located on an inner side 42 of the backing member 14. According to another aspect, a soap/foam dispenser 44 may be secured to the retaining plate 40 and may be in communication with a fluid line 46 that passes through the interior of the stem portion 12 and delivers soap and fluid thereto. According to another aspect, the soap/foam dispenser 44 may include a plurality of openings 48 formed in an outer surface thereof that serve to emit the soap fluid onto the inner side 42 of the backing member 14 and into communication with the plurality of media elements 16 for use in treating the vehicle exterior. According to a further aspect, the soap/foam dispenser 44 may include four openings 48. It will be appreciated that more or less openings may be included as desired. According to another aspect and as shown best in FIG. 7, the openings 48 may be configured such that they are angled to direct fluid outwardly away from the centerline $C_L$ and toward the outer periphery 26 of the backing member 14. According to an aspect, this configuration promotes full coverage of the media elements 16 by the soap/foam fluid. It will also be appreciated that that the openings can take on a variety of different configurations and that they can be oriented in a variety of other suitable directions.

Figure 9:
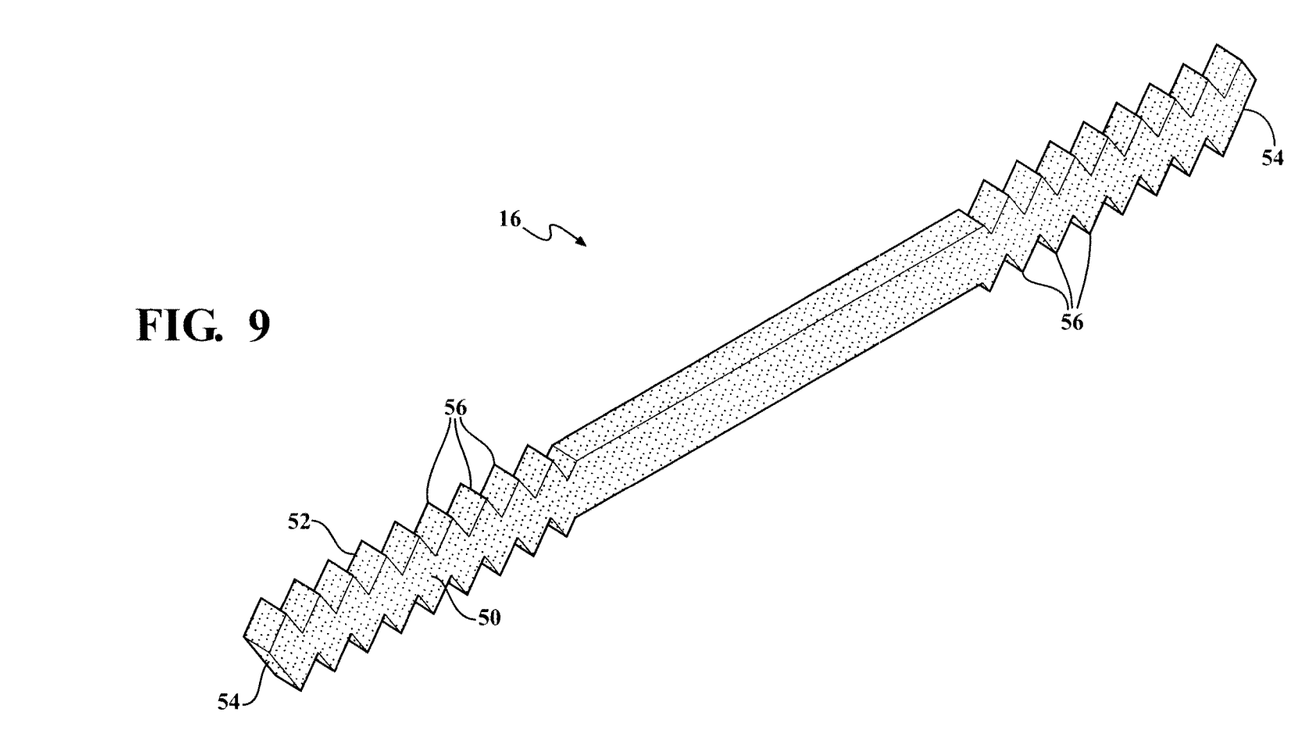
FIG. 9 is a perspective view of a media element for a rotary brush assembly according to an aspect of the present disclosure.
Figure 10:
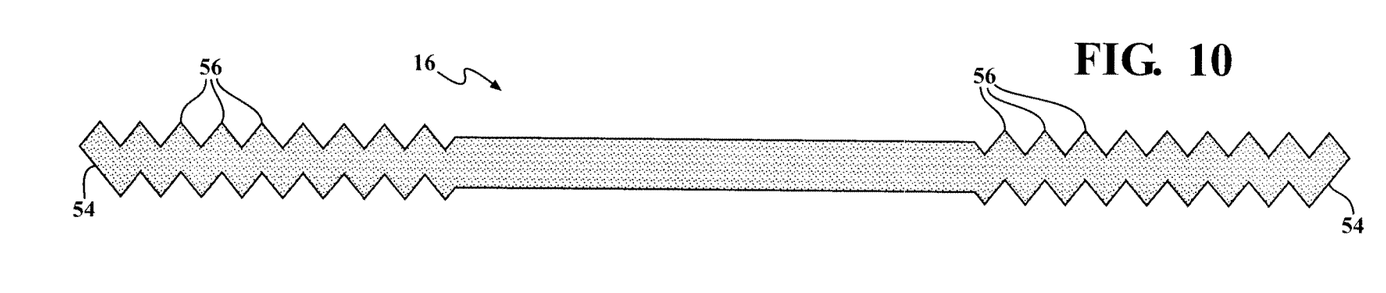
FIG. 10 is a side view of a media element for the rotary brush assembly of FIG. 1.

As shown in FIGS. 9 and 10, according to an aspect, the media elements 16 can have a first side 50, a second side 52 and a pair of end portions 54. According to an aspect, each side portion 50, 52 may have a generally serrated shape including a plurality of teeth 56. It will be appreciated that instead of teeth a variety of other discontinuous structures may be employed, which can facilitate cleaning. According to an aspect, the discontinuous surface on either side 50, 52 of each media element 16 can provide improved cleaning of a vehicle exterior. According to another aspect, the end portion 54 can be pointed. It will be appreciated that the media elements 16 can have a variety of different shapes, sizes, and configurations. Further, the media elements 16 can be formed of a variety of different materials and by a variety of different forming or manufacturing processes.

Figure 6:
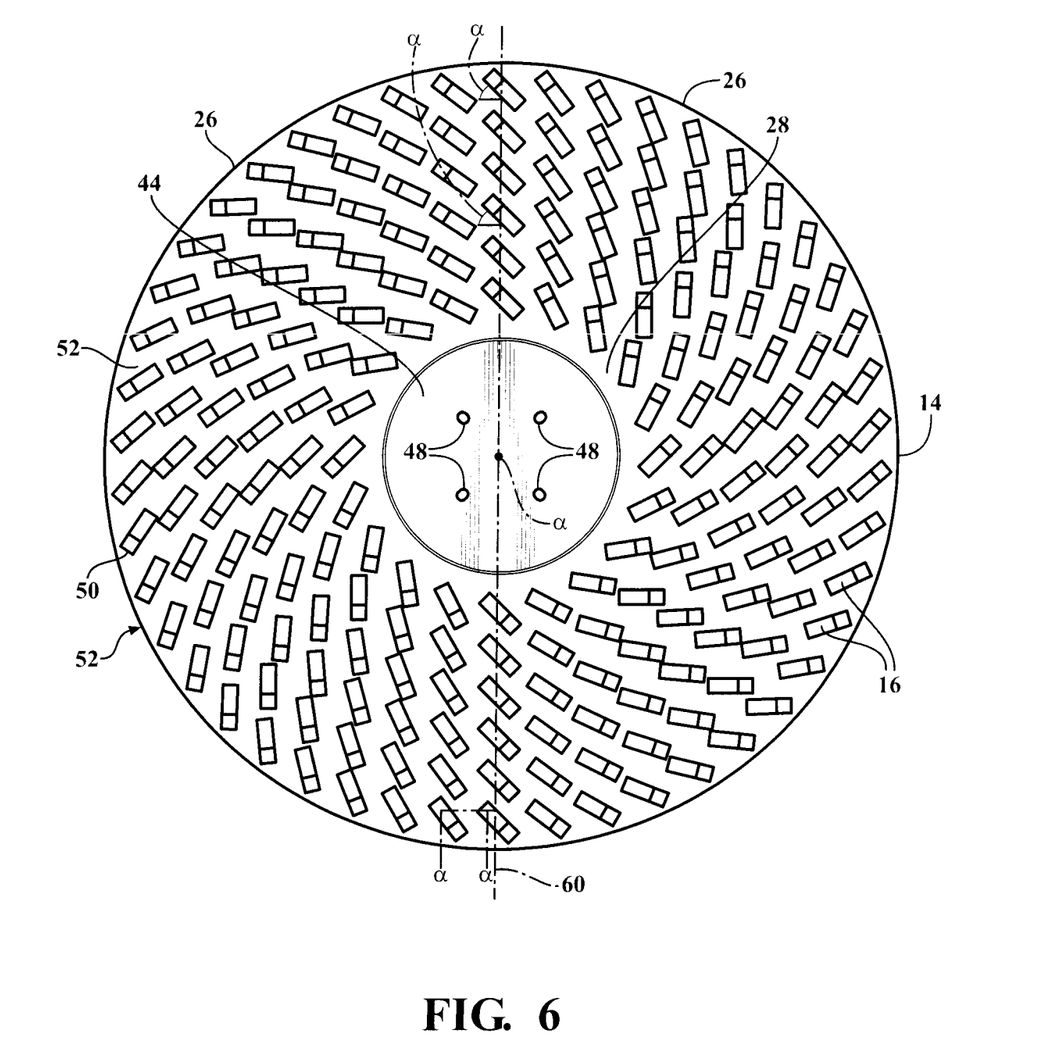
FIG. 6 is a front view of the rotary brush assembly of FIG. 1.
Figure 7:
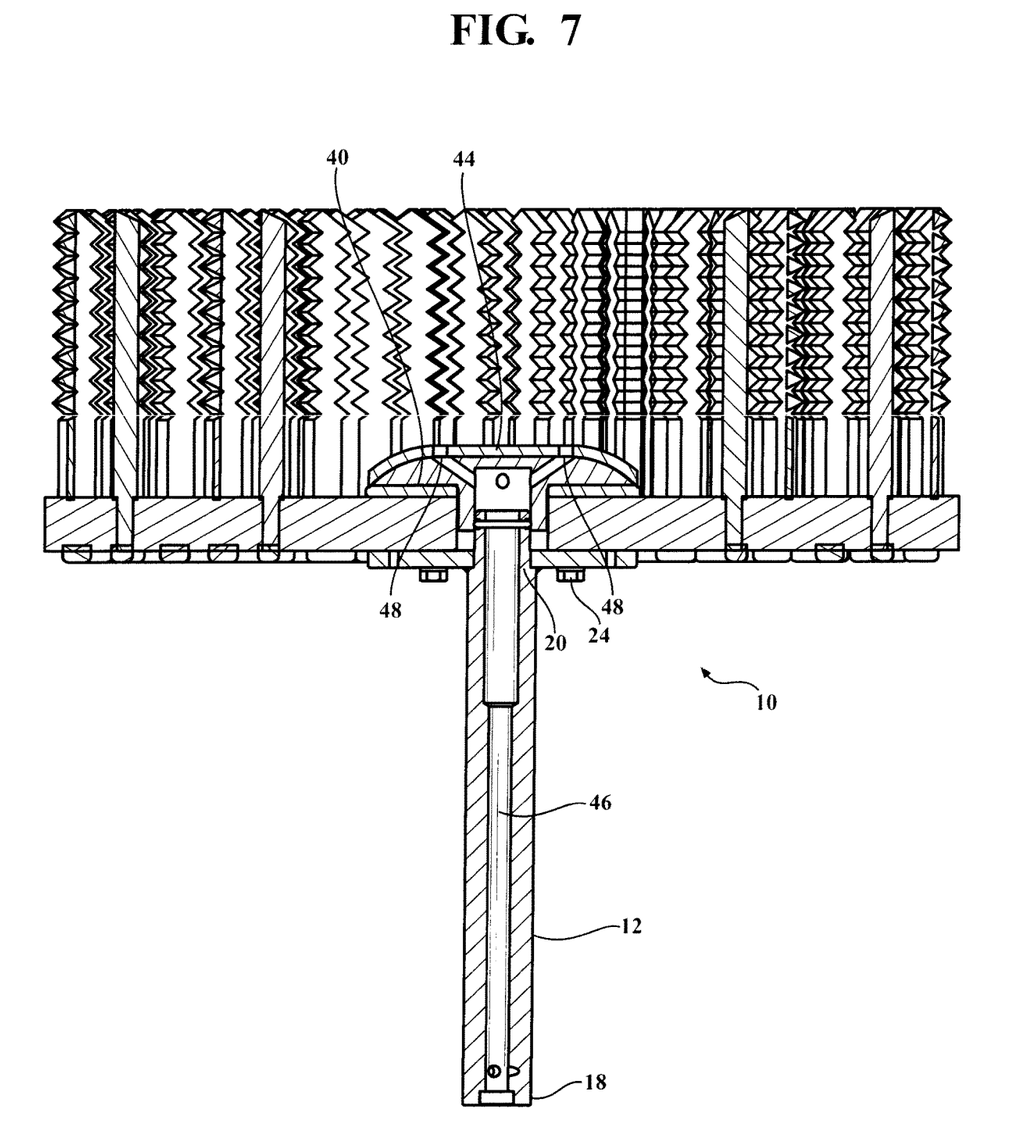
FIG. 7 is a cross-sectional view of the rotary brush assembly of FIG. 1.
Figure 8:
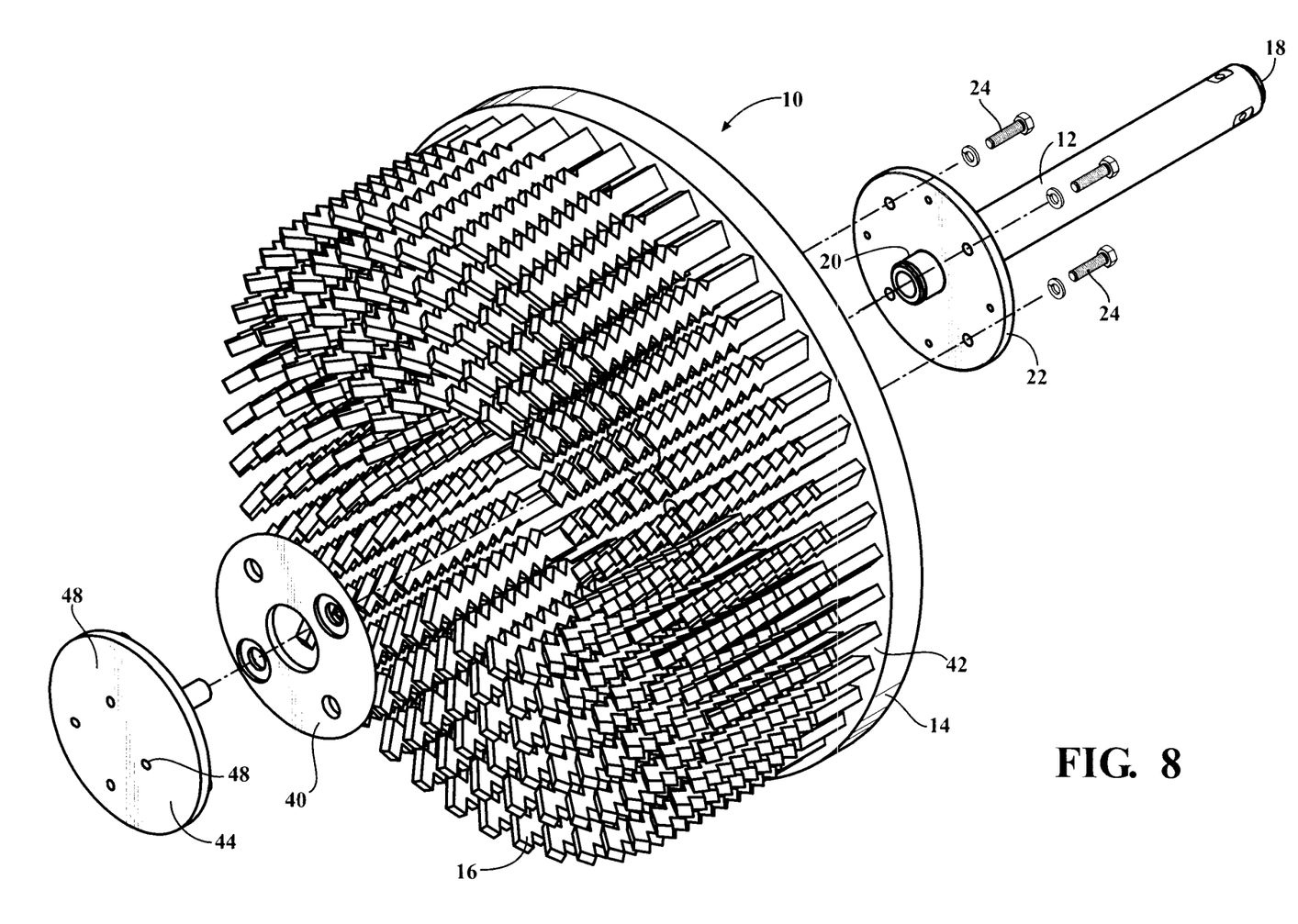
FIG. 8 is an exploded view illustrating the components of the rotary brush assembly of FIG. 1.

According to a still further aspect and as schematically illustrated in FIG. 6, the backing member 14 can include a radial hemispherical reference line defined through a center point Cp, which is defined generally by reference number 60. This radial hemispherical reference line 60 may be oriented perpendicular to the axis of rotation. According to an aspect, the media elements 16 may be secured to the backing member 14 at a non-90 degree angle with respect to the radial hemispherical line 60 as generally defined by angle (a). According to an aspect, if the angle of orientation is greater than 90 degrees, a footprint created by the media elements, as defined by an outermost point of the media elements and indicated generally by reference number 52, can increase as the backing member 14 rotates in contact with a vehicle surface. In other words, according to an aspect, by this configuration, the defined operational footprint can increase which allows the effective footprint of a component to be increased to cover a larger area as desired. According to another aspect, if the angle of orientation of the media elements 16 is less than 90 degrees, a defined footprint of the media elements, as indicated by reference number 52, can decrease as the backing member rotates in contact with a vehicle surface. It will be appreciated that the effective change in footprint diameter can vary based on the change in the angle of orientation of the attachment of the media elements 16 to the backing member 14.

Figure 11:
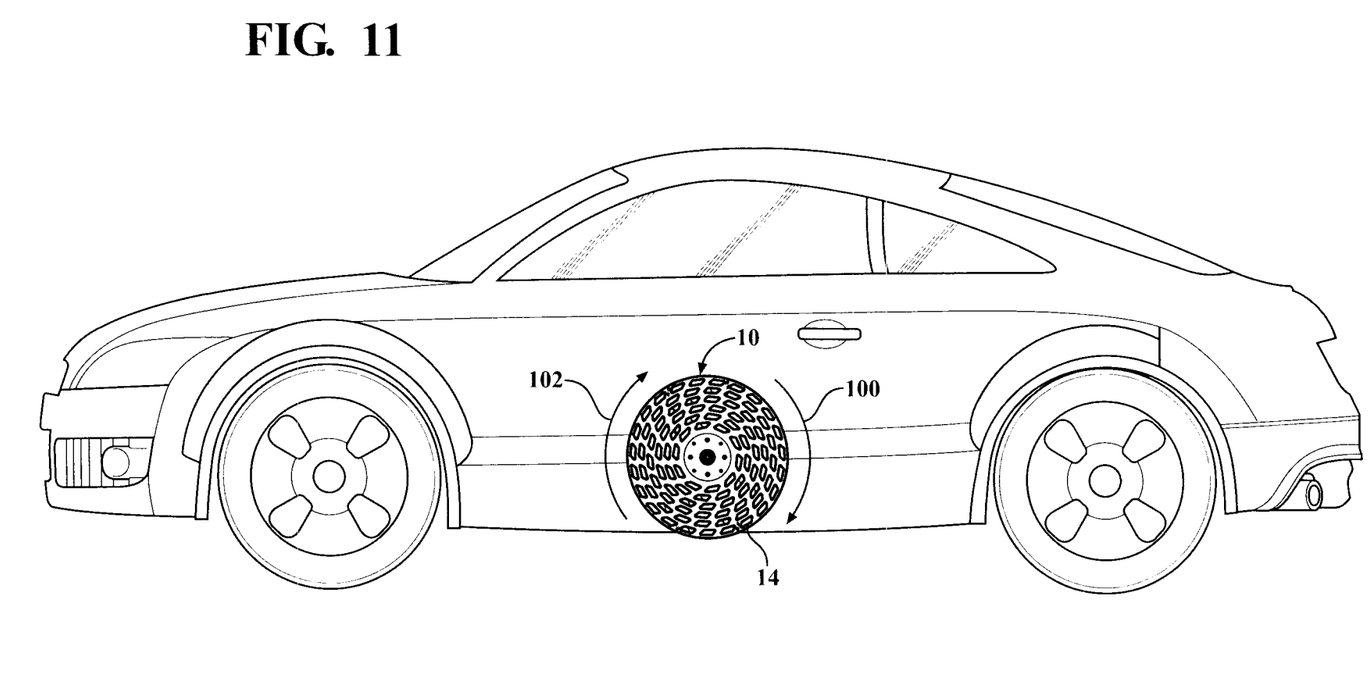
FIG. 11 is a schematic drawing illustrating the operation of a rotary brush assembly in accordance with an aspect of the present disclosure.
Figure 12:
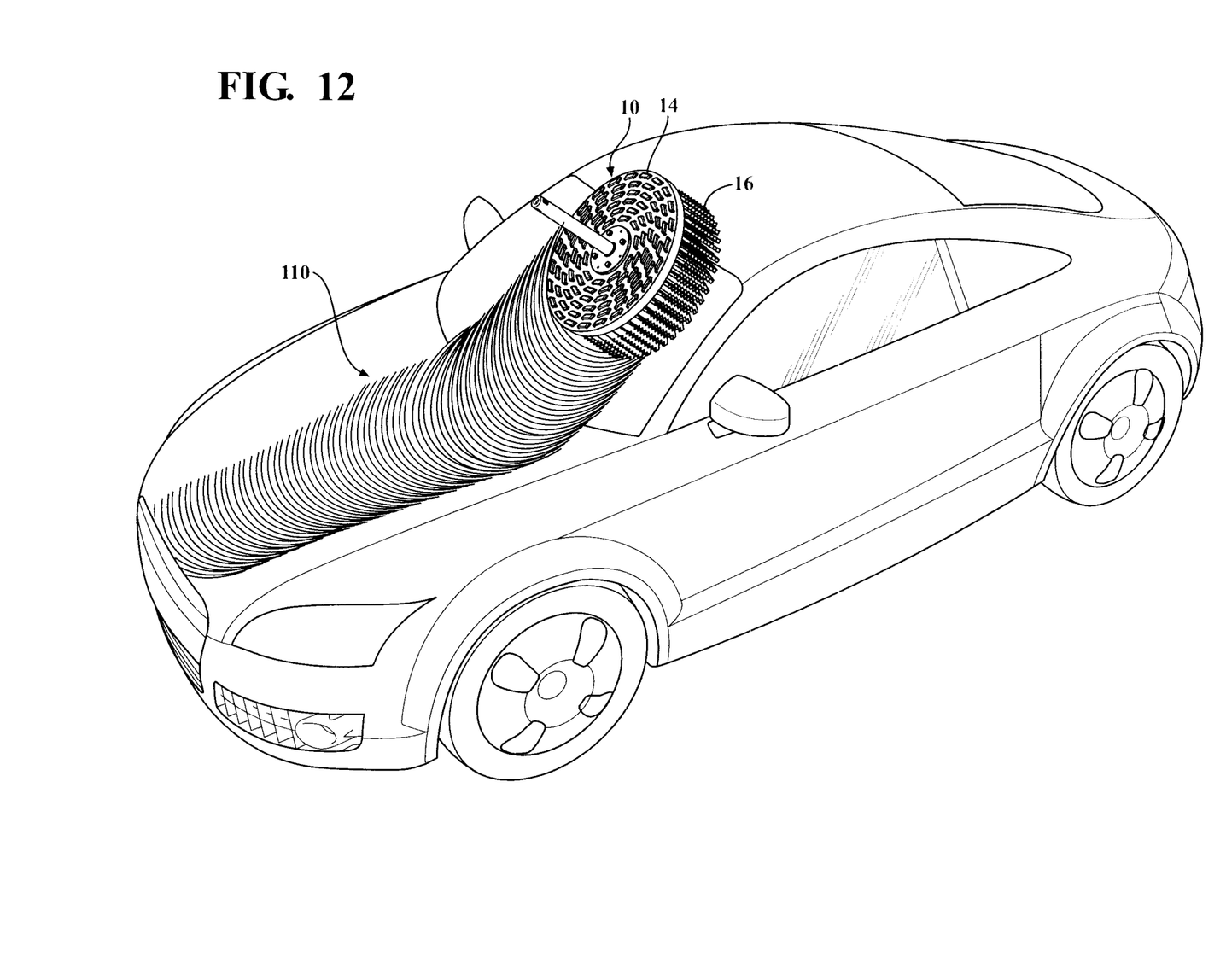
FIG. 12 is a schematic illustration of a cleaning pattern created by a rotary brush assembly in accordance with an aspect of the present disclosure.
Figure 13:
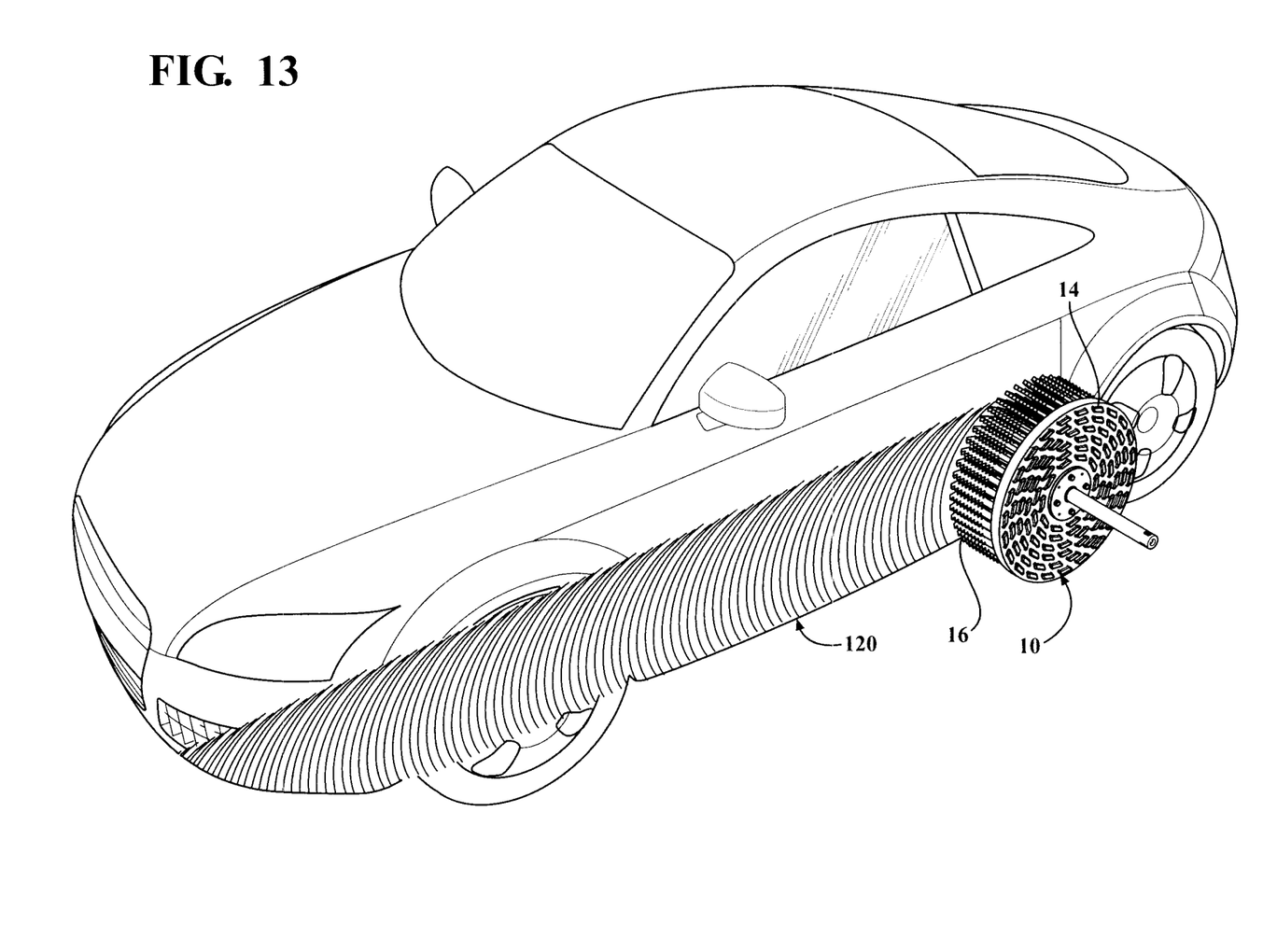
FIG. 13 is a schematic illustration of a cleaning pattern created by a rotary brush assembly in accordance with another aspect of the present disclosure.

According to an aspect and with reference to FIGS. 11 through 13, the cleaning operation of the disclosed brush is schematically illustrated. According to this aspect, the brush assembly 10 can provide multi-directional cleaning on a vehicle exterior. Multi-directional cleaning allows the media elements 16 of the brush assembly 10 to engage a vehicle surface in multiple different directions to provide more effective cleaning capabilities in order to remove more dirt and debris from an exterior vehicle surface as compared to a brush yielding only single direction cleaning. According to an aspect and with reference to FIG. 11, as the backing member 14 rotates in clockwise direction, the media elements 16 on a rearward half of the brush assembly 10 can engage the vehicle exterior in a downward direction, as generally indicated by reference number 100. At the same time, the media elements 16 on a forward half of the brush assembly 10 can engage the vehicle exterior in an upward direction, as generally indicated by reference number 102. Thus, as the brush assembly 10 travels along the vehicle surface (due to movement of the brush assembly 10 with respect to the vehicle or movement of the vehicle with respect to the brush assembly 10) the same portion of the vehicle exterior can be subject to cleaning in both an upward and downward direction to provide more effective cleaning.

According to an aspect, exemplary cleaning patterns created by an exemplary brush assembly are generally illustrated in FIGS. 12 and 13. According to an aspect, the exemplary brush assembly 10 may be employed to clean a top exterior surface of a vehicle as illustrated in FIG. 12. In this configuration, the brush assembly 10 may move along the upper vehicle surface in a rearward direction (from the front of the vehicle to the rear of the vehicle). This can create an exemplary cleaning pattern, as generally illustrated by reference number 110 that provides increased surface contact resulting from multi-directional contact between the media elements and the vehicle exterior surface.

Similarly, the brush assembly 10 may be configured to move along a side surface of the vehicle in a rearward direction (from the front of the vehicle to the rear of the vehicle). This can create an exemplary cleaning pattern, as generally illustrated by reference number 120 that provides increased surface contact resulting from multi-directional contact between the media elements and the vehicle exterior surface. As will be appreciated, the exemplary cleaning patterns 110, 120, illustrate the increased cleaning capabilities of the disclosed brush assembly 10. It will be appreciated that the brush assembly 10 may be configured to yield cleaning patterns of different shapes and configurations.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The invention claimed is:

1. A component for a vehicle wash, comprising: a base portion disposed adjacent a vehicle treatment area; a rotatable stem portion having an axis of rotation:
a flexible backing member secured to the rotatable stem portion and configured to rotate therewith about the axis of rotation;
a plurality of media elements secured to the flexible backing member, the plurality of media elements being constructed of a substantially self-supporting material; the plurality of media elements being configured to rotate in a working plane defined by the backing member and wherein the working plane is oriented substantially perpendicular to the axis of rotation;
a spring mounted on and surrounding the rotatable stem portion, said spring biasing the flexible backing member in a direction parallel to the axis of rotation such that the plurality of media elements are configured to contact at least an exterior painted surface of a vehicle during a wash process and wherein the flexible backing member and the spring biasing enables the plurality of media elements to maintain contact of said media elements and to conform to a shape of the exterior painted surface of the vehicle during the wash process and to thereby clean the exterior painted surface of the vehicle as relative lateral movement occurs between the vehicle and the flexible backing member; and
the component further comprising a support arm that is pivotably secured at a first end to the base portion by a pivotable connection and in communication with the rotatable stem portion at a second end, the component further comprising a first control cylinder and a second control cylinder wherein each of the control cylinders is connected to the base portion at a first end and to the support arm at a second end, wherein the first control cylinder and the second control cylinder move in opposite directions simultaneously to rotate the support arm about the pivotable connection and to thereby adjust the angle between the axis of rotation and the exterior painted surface of the vehicle.

2. The component of claim 1, wherein the backing member has a substantially circular shape.

3. The component of claim 1, wherein the backing member has an outer perimeter that is discontinuous.

4. The component of claim 3, wherein the backing member includes a plurality of individual spokes that are spaced apart from one another.

5. The component of claim 1, wherein the plurality of media elements are constructed of an ethylene vinyl acetate material.

6. The component of claim 1 wherein the rotatable stem portion is in communication with a drive mechanism to effectuate rotation of the backing member about the axis of rotation.

7. The component of claim 1, wherein the backing member has a substantially concave shape as defined with respect to a vehicle treatment area of the vehicle wash system.

8. The component of claim 1, wherein the axis of rotation of the stem portion is oriented substantially perpendicular to the exterior painted surface.

9. The component of claim 1, wherein the axis of rotation of the stem portion is oriented at an angle of approximately 30 degrees with respect to the exterior painted surface.

10. The component of claim 1, wherein the backing member is constructed of a flexible material having memory such that it is configured to deflect and return to its original position.

11. The component of claim 1, wherein the backing member includes a soap/foam dispenser disposed on an outer surface thereof and wherein the soap/foam dispenser includes a plurality of fluid openings that are configured to emit a fluid into communication with the plurality of media elements.

12. The component of claim 11, wherein the plurality of fluid openings are configured such that they direct fluid outwardly toward a periphery of the backing member.

13. The component of claim 1, wherein the plurality of media elements include a first side and a second side and opposing serrations on each of the first side and the second side.

14. The component of claim 1, wherein backing member includes a radial hemispherical line defined through a center point that is oriented perpendicular to the axis of rotation and wherein the plurality of media elements are secured to the backing member such that a middle portion of each media element is at a non-90 degree angle with respect to the radial hemispherical line.

15. The component of claim 14, wherein the plurality of media elements defines a footprint, and wherein the footprint increases as the backing member rotates.

16. The component of claim 1, wherein the plurality of media elements each have substantially the same length.

17. A rotary wash component for use in a vehicle wash system, comprising:
a base portion disposed adjacent a vehicle treatment area;
a rotatable stem portion having an axis of rotation;
a flexible backing member formed of a material having a memory such that if can flex and return to its original position, the flexible backing member secured to the rotatable stem portion and configured to rotate therewith about the axis of rotation, the backing member being configured substantially perpendicular to the axis of rotation, the backing member further comprising a plurality of openings for emitting a fluid onto a plurality of media elements;
the plurality of media elements secured to the backing member, the plurality of media elements being constructed of a substantially self-supporting material such that they extend substantially parallel to the axis of rotation, the plurality of media elements being constructed of a flexible wash media material and all configured to contact at least one painted surface of a vehicle during a wash process, thereby cleaning the at least one painted surface of the vehicle;
a spring mounted on and surrounding the rotatable stem portion, said spring biasing the backing member in a direction parallel to the axis of rotation toward the at least one painted surface while allowing the backing member to move away from the at least one painted surface in response to contact therewith so that the backing member can follow a shape of the at least one painted surface and remain in contact therewith;
the plurality of media elements being configured to rotate about the axis of rotation and contact the painted surface of the vehicle with a leading edge and a trailing edge simultaneously to provide multi-directional cleaning capabilities and whereby the flexible backing member and the biasing mechanism maintains the plurality of media elements in conformation to a shape of the painted surface of the vehicle during the wash process and to thereby dean the painted surface of the vehicle; and the rotary wash component further comprising a support arm that is pivotably secured at a first end to the base portion by a pivotable connection and in communication with the rotatable stem portion at a second end, the rotary wash component further comprising a host control cylinder and a second control cylinder wherein each of the control cylinders is connected to the base portion at a first end and to the support arm at a second end, wherein the first control cylinder and the second control cylinder move in opposite directions simultaneously to rotate the support arm about the pivotable connection and to thereby adjust the angle between the axis of rotation and the painted surface of the vehicle to an angle of from 90 to 30 degrees.

18. The component of claim 17, wherein the backing member has a substantially circular shape.

19. The component of claim 17, wherein the backing member has a discontinuous outer perimeter.

20. The component of claim 17, wherein the backing member has a substantially concave shape.

21. The component of claim 17, wherein the axis of rotation of the stem portion is oriented substantially parallel to the ground.

22. The component of claim 17, wherein the plurality of media elements each have substantially the same length.

23. A component for a vehicle wash, comprising:
a brush support portion disposed adjacent a vehicle treatment area;
a rotatable stem portion having an axis of rotation and being mounted to the brush support portion;
a flexible backing member in communication with the rotatable stem portion and configured to rotate therewith about the axis of rotation;
the component further comprising a support arm that is pivotably secured at a first end to a base portion by a pivotable connection and in communication with the brush support portion at a second end, the component further comprising a first control cylinder and a second control cylinder wherein each of the control cylinders is connected to the base portion at a first end and to the support arm at a second end, wherein the first control cylinder and the second control cylinder move in opposite directions simultaneously to rotate the support arm about the pivotable connection and to thereby urge the backing member toward a vehicle treatment area so as to contact an exterior painted surface of a vehicle as relative movement occurs between the vehicle and the backing member;
a spring mounted on and surrounding the rotatable stem portion, said spring biasing the flexible backing member in a direction parallel to the axis of rotation toward the vehicle treatment area and also allowing the backing member to move away from the vehicle treatment area in response to a shape of the exterior painted surface as the backing member moves along a length thereof;
a plurality of media elements secured to the flexible backing member, the plurality of media elements being constructed of a substantially self-supporting material; the plurality of media elements being configured to rotate in a working plane defined by the backing member and wherein the working plane is oriented perpendicular to the axis of rotation; and
wherein all of the plurality of media elements are configured to contact the exterior painted surface of a vehicle during a wash process and whereby the flexible backing member, control cylinders in conjunction with the support arm, spring and the brush support portion maintain the plurality of media elements in conformation to the shape of the exterior painted surface of the vehicle during the wash process and to thereby clean the exterior painted surface of the vehicle.

24. The component of claim 23, wherein the flexible backing member is constructed of a flexible material having memory such that it is configured to deflect and return to its original position.

25. The component of claim 23, wherein the flexible backing member includes a soap/foam dispenser disposed on an outer surface thereof and wherein the soap/foam dispenser includes a plurality of fluid openings that are configured to emit a fluid into communication with the plurality of media elements.

26. The component of claim 23, wherein the control cylinders and support arm permit the axis of rotation of the stem portion to be oriented at an angle of from 90 to 30 degrees with respect to a vehicle treatment area during the wash process.

27. The component of claim 23, wherein the component is part of roll-over vehicle wash system where the vehicle remains stationary and the component moves with respect to the vehicle.

28. The component of claim 23, wherein the component is part of a tunnel wash system where the vehicle is conveyed past the component.

* * * * *